United States Patent [19]

Johnson et al.

[11] 4,222,233

[45] Sep. 16, 1980

[54] AUXILIARY LIFT PROPULSION SYSTEM WITH OVERSIZED FRONT FAN

[75] Inventors: James E. Johnson, Hamilton; Onofre T. M. Castells, Fairfield; Dan J. Rundell, Madeira, all of Ohio

[73] Assignee: General Electric Company, Cincinnati, Ohio

[21] Appl. No.: 820,657

[22] Filed: Aug. 2, 1977

[51] Int. Cl.$^2$ .............................................. F02K 9/06
[52] U.S. Cl. ........................................ 60/225; 60/229; 60/261; 60/262
[58] Field of Search .................... 60/224, 225, 226 B, 60/229, 232, 262, 263, 230, 261

[56] References Cited

U.S. PATENT DOCUMENTS

| | | | |
|---|---|---|---|
| 2,912,188 | 11/1959 | Singelmann et al. | 60/232 |
| 3,186,165 | 6/1965 | Edkins | 60/224 |
| 3,255,585 | 6/1966 | Grieb | 60/262 |
| 3,263,416 | 8/1966 | Bill et al. | 60/262 |
| 3,368,352 | 2/1968 | Hewson | 60/224 |
| 3,867,813 | 2/1975 | Leibach | 60/225 |
| 4,010,608 | 3/1977 | Simmons | 60/226 B |
| 4,080,785 | 3/1978 | Koff et al. | 60/226 R |

*Primary Examiner*—Douglas Hart
*Attorney, Agent, or Firm*—Robert C. Lampe, Jr.; Donald W. Walk; Derek P. Lawrence

[57] ABSTRACT

A propulsion system for use primarily in V/STOL aircraft is provided with a variable cycle, double bypass gas turbofan engine and a remote augmenter to produce auxiliary lift. The fan is oversized in air-pumping capability with respect to the cruise flight requirements of the remainder of the engine and a variable area, low pressure turbine is capable of supplying varying amounts of rotational energy to the oversized fan, thereby modulating its speed and pumping capability. During powered lift flight, the variable cycle engine is operated in the single bypass mode with the oversized fan at its maximum pumping capability. In this mode, substantially all of the bypass flow is routed as an auxiliary airstream to the remote augmenter where it is mixed with fuel, burned and exhausted through a vectorable nozzle to produce thrust for lifting. Additional lift is generated by the high energy products of combustion of the variable cycle engine which are further energized in an afterburner and exhausted through a thrust vectorable nozzle at the rear of the engine. In the cruise operating mode, the fan is driven at a slower rotational speed and all of the bypass flow is directed to a variable area bypass injector where it is mixed with the variable cycle engine products of combustion and exhausted as a mixture through the rear nozzle. The variable cycle engine can be selectively operated in the single or double bypass mode during cruise to maximize efficiency as the aircraft speed is varied. Because the total installed thrust is available in the forward cruise mode, an aircraft powered by the propulsion system of the present invention has substantially greater capabilities in the areas of excess power, acceleration time and combat ceiling when compared to prior art conceptions embodying separate lift plus lift/cruise engines. Additionally, by not having to develop and maintain a separate lift engine system, a substantially lower aircraft lift cycle cost is possible.

14 Claims, 3 Drawing Figures

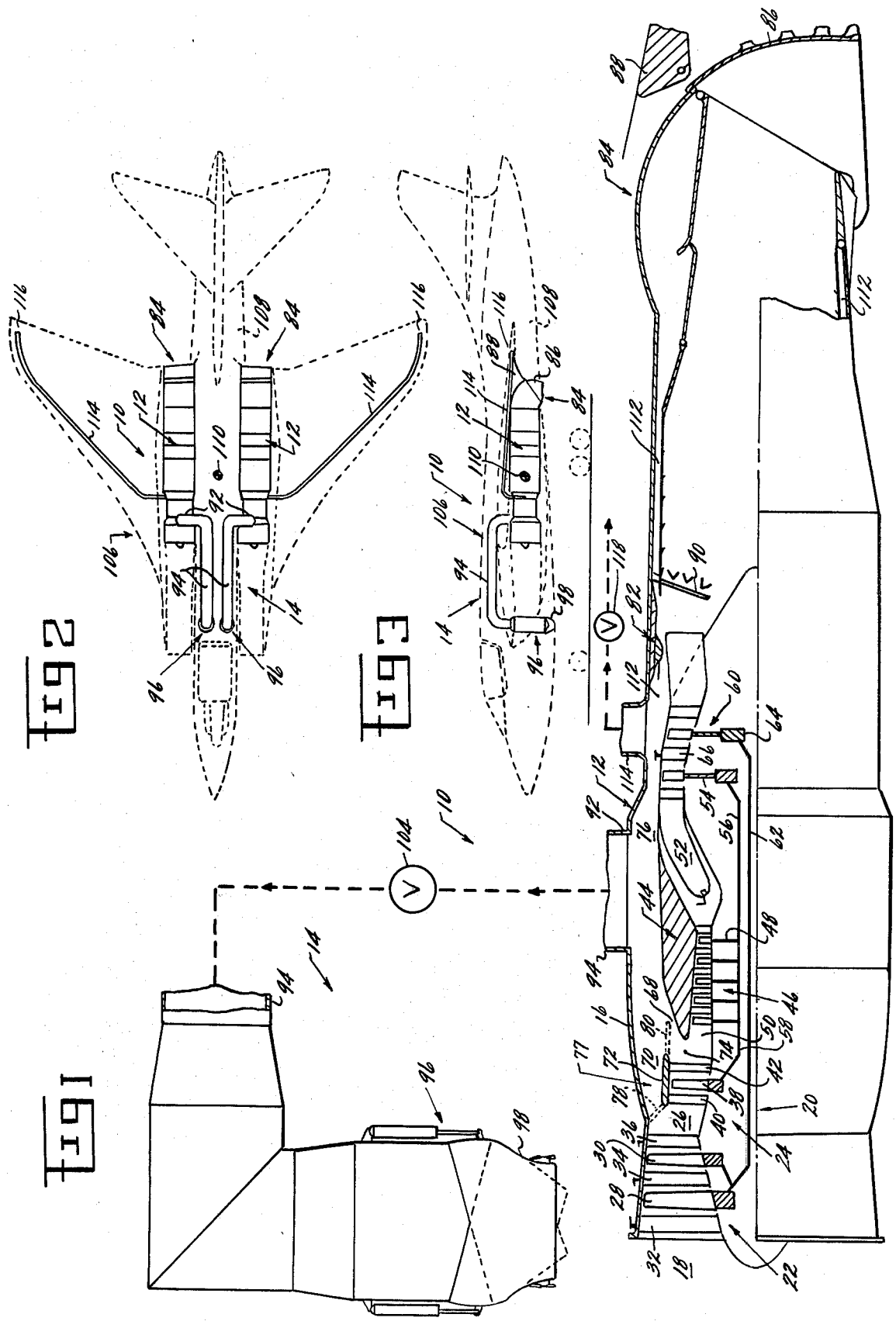

AUXILIARY LIFT PROPULSION SYSTEM WITH OVERSIZED FRONT FAN

BACKGROUND OF THE INVENTION

The present invention relates to aircraft propulsion systems and, more particularly, to a propulsion system embodying a variable cycle gas turbofan engine for use primarily in vertical or short takeoff and landing (V/STOL) aircraft.

In recent years, much attention has been directed toward developing what have been generally referred to as "variable cycle" engines, a family of hybrid gas turbofan engines which can operate with the high specific thrust, characteristic of a low bypass ratio turbofan or turbojet at supersonic speeds, and yet also exhibit the lower specific thrust, low noise and low fuel consumption, characteristic of a high bypass ratio turbofan. The need for such a variable cycle engine has arisen, in part, because of reduced world-wide fuel reserves, increased fuel costs and the expanded operational requirements projected for future aircraft. These factors tend to dictate that future engines will require reduced fuel consumption and increased operational flexibility. It is now well understood that aircraft which are to operate effectively and efficiently in both the subsonic and supersonic speed regimes will require such engines which exhibit the characteristics of both the high bypass ratio turbofan and the turbojet (or low bypass ratio turbofan). In addition, if the aircraft is projected to operate in the V/STOL mode (as from a mini-aircraft carrier or small airfield), large variations in propulsive thrust will also be required. For example, during takeoff and landing the engine must produce a very high level of lift thrust, a level in excess of the aircraft gross weight, and thus may be oversized for many of the forward flight cruise operating conditions. This resulting configuration of a grossly oversized cruise system is not easily adapted into a superior supersonic fighter aircraft. As of yet, no truly viable propulsion system has emerged which combines the necessary V/STOl lift features in an engine which offers effective mixed mission capabilities and reasonable life cycle cost projections.

Prior attempts at designing supersonic V/STOL fighters using state-of-the-art propulsive technology embodying powered lift have necessitated compromise in the propulsive cycle and engine design, resulting in aircraft having high takeoff gross weights or reduced operational capabilities. These prior art propulsion systems have either incorporated oversized engines (oversized with respect to the forward flight thrust requirements) to generate sufficient lift thrust or else incorporate separate lift engines which are utilized only in the powered lift mode. With either configuration, the resulting aircraft has an inordinately high takeoff gross weight which penalizes performance. Variable cycle engines offer a solution to this dilemma by providing a propulsion system which comprises a viable compromise for aircraft generally, and V/STOL aircraft in particular. Such a propulsive system must be able to produce very high thrust levels for powered lift during takeoff and landing and yet transition efficiently between the subsonic and supersonic operating modes. The present invention incorporates the novel approach to providing, efficiently, both the powered lift and cruise thrust of a V/STOL aircraft while not compromising the normal cruise operating modes, whether subsonic or supersonic.

SUMMARY OF THE INVENTION

It is, therefore, a primary object of the present invention to provide a propulsion system for use primarily in a V/STOL aircraft in which powered lift is obtained without compromise to a wide range of cruise operating modes.

It is also an object of the present invention to provide a propulsion system which incorporates a variable cycle gas turbofan engine for efficient operation throughout a wide range of cruise Mach numbers.

It is yet another object of the present invention to provide such a propulsion system which will be adaptable to supersonic aircraft, thereby permitting a viable mixed mission V/STOL aircraft to be developed.

These and other objects and advantages will be more clearly understood from the following detailed description, the drawing and specific examples, all of which are intended to be typical of, rather than in any way limiting on, the scope of the present invention.

Briefly stated, the above objects are accomplished in the preferred embodiments of the present invention wherein the propulsion system includes a double bypass, variable cycle gas turbofan engine in conjunction with a remote augmenter system to which bypass air is ducted, mixed with fuel and burned and then exhausted through a swivelable nozzle to generate auxiliary lift during the powered lift operating conditions. In one embodiment, the variable cycle engine incorporates a split fan and a forward variable area bypass injector (VABI) for selectively pressurizing the bypass airflow portions. The split fan is oversized to the normal cruise requirements with respect to the rest of the engine and is driven by a single stage, variable area, low pressure turbine. This oversized front fan provides a large amount of pressurized auxiliary bypass airflow (approximately 20–30%) for use in the remote augmenter system during powered lift. Additional lift is generated by the high energy products of combustion of the variable cycle engine which are further energized in an afterburner and exhausted through a thrust vectorable nozzle at the rear of the engine. This nozzle enhances in-flight maneuvering in addition to providing exhaust deflection for powered lift. For vertical takeoff and landing, the variable cycle engine operates in the single bypass mode in which substantially all of the additional pressurized fan air is bypassed around the high pressure compressor, collected and ducted to the remote augmenter which, by way of example, could be located in the aircraft nose section. The vectorable nozzles on both the engine and remote augmenter provide a useful set of separated thrust vectors for V/STOL operation, provide aircraft pitch control through differential thrust modulation and provide a potential for in-flight maneuvering through the use of selective thrust vectoring.

Transition to a forward flight speed sufficient to generate aerodynamic lift is achieved by a gradual rotation of the engine exhaust thrust vector through repositioning of a deflector associated with the rear exhaust nozzle followed by a reduction of lift thrust from the remote augmenter. Since the oversized fan is operating near its maximum capability during powered lift, reduction in remote augmenter lift thrust is accomplished by a reduction in fan speed to the nominal forward flight bypass ratio condition through modulation of the variable area, low pressure turbine nozzle as the air supply to the remote augmenter is cut off through closure of a valve in the ducting associated with the remote augmenter. Thereafter, the engine bypass ratio is modulated in forward flight for optimum performance. Because the total installed thrust is available in forward flight, an aircraft configured in accordance with the present inventive propulsion system has substantially greater operational capabilities in the areas of, for example, excess power, acceleration times, and combat ceiling. It is also anticipated that significant savings in life cycle costs will be realized by not having to provide and maintain a separate lift engine system.

DESCRIPTION OF THE DRAWING

While the specification concludes with claims particularly pointing out and distinctly claiming the subject matter of the present invention, it is believed that the invention will be more fully understood from the following description of the preferred embodiments which is given in connection with the accompanying drawing in which:

FIG. 1 is a schematic, partial cutaway view of an aircraft propulsion system incorporating the present invention;

FIG. 2 is a plan form sketch depicting the installation of the propulsion system of FIG. 1 in a hypothetical V/STOL aircraft; and FIG. 3 is a side view of the propulsion system installation in the aircraft of FIG. 2.

DESCRIPTION OF THE PREFERRED EMBODIMENT

Referring to the drawings, wherein like numerals correspond to like elements throughout, attention is first directed to FIG. 1 wherein an aircraft propulsion system depicted generally at 10 and embodying the present invention is diagrammatically shown. As previously discussed, the remote augmented lift system concept depicted in FIG. 1 is a result of a desire to eliminate separate direct lift engines which have typified the prior art lift plus lift/cruise systems. This is made possible in the present invention by an adaptation of a variable cycle engine (VCE), depicted generally at 12, which possesses the flexibility to supply a large amount of pressurized fan air to a remote augmenter, depicted generally at 14, for aircraft vertical takeoff and landing (VTOL) operation, and a variable, optimized quantity of fan airflow via internal ducting and valving to provide thrust for aircraft flight transition, acceleration and cruise.

Directing attention particularly to the variable cycle engine 12, it may be seen that the arrangement is similar to that disclosed in U.S. Pat. No. 4,010,608 issued to John R. Simmons, which is assigned to the same assignee as the present invention and the subject matter of which is incorporated herein by reference. Briefly, the engine includes an outer casing 16, the forward end of which forms an inlet 18 sized to provide a predetermined maximum design airflow at the powered lift operating condition. Disposed within this inlet is a split fan shown generally at 20 for selectively receiving and pressurizing the airflow delivered through inlet 18. The fan includes a front section 22 axially displaced from an aft section 24 by a space designated generally at 26. The front section comprises two stages with two annular rows of rotor blades 28 and 30 interspaced between annular rows of variable inlet guide vanes 32 and variable stator vanes 34 and 36. The aft section 24 comprises a single stage having rotor blades 38 interspaced between rows of aft fan stator vanes 40 and 42.

Downstream of fan 20 there is provided a core engine 44 including an axial flow compressor 46 having a rotor 48. A portion of the air compressed by both sections of fan 20 enters core engine inlet duct 50, is further compressed by the axial flow compressor 46 and then is discharged to a combustor 52 where it is mixed with fuel and burned to provide high energy combustion gases which drive a core engine turbine 54. Turbine 54, in turn, drives rotor 48 through a shaft 56 in the normal manner of a gas turbine engine. Additionally, the high pressure, core engine turbine 54 drives aft fan section 24 through an upstream extending fan shaft 58 interconnecting the core engine compressor rotor 48 and aft fan rotor 38. The hot gases of combustion then pass to and drive a variable area low pressure fan turbine 60 which, in turn, drives the front fan section 22 through fan shaft 62. The low pressure turbine 60 includes a rotor section 64 interconnected with shaft 62 and a preceding variable area low pressure turbine nozzle 66 which modulates the energy extraction by rotor 64, thereby varying the rotational speed characteristic of forward fan section 22. The turbine nozzle area is varied by changing the inlet angle of variable angle vanes. The technology of variable area turbine nozzles utilizing variable angle vanes is conventional and well known to those skilled in the art. Generally speaking, the foregoing arrangement of fan sections and turbines divides the fan work between the low and high pressure turbines to permit more efficient utilization of the total available turbine capacity, reduction in low pressure turbine workload, increased aft fan stage pressure ratio capability and greater flow and pressure ratio modulation potential for a split fan gas turbine engine.

In order to bypass a portion of the fan airflow around the core engine 44, there are provided two concentric bypass ducts 68 and 70 separated by an intermediate casing 72. The upstream end of outer bypass duct 70 terminates in the annular space 26 downstream of the front fan section 22 whereas the upstream end of the inner bypass duct 68 terminates in an axial space 74 separating the aft fan section 24 and core engine 44 such that airflow compressed by and exiting aft fan section 24 is divided between the inner bypass duct 68 and inlet 50 to the core engine 44. The inner and outer bypass ducts merge into a common bypass duct 76 at the downstream end of intermediate casing 72.

The variable cycle engine is also provided with a forward variable area bypass injector (VABI) 77 which comprises one example of a means for selectively pressurizing and modulating the flow of the bypass airflow portions through the inner and outer bypass ducts and into the common bypass duct 76. This bypass injector comprises an upstream variable area double bypass selector valve 78 of the sliding variety associated with the inlet to outer bypass duct 70, the position of which determines whether the engine will operate in the single or double bypass mode, and a variable position downstream static pressure valve 80 at the confluence of the inner and outer bypass streams which defines an optimum diffuser flow path for injecting the inner bypass stream into the outer bypass duct. The variable area bypass injector is described in greater particularity in U.S. Pat. No. 4,175,384, issued to Conrad D. Wagenknecht et al., filed concurrently with the present application and which is assigned to the assignee of the present invention and the subject matter of which is incorporated herein by reference. In essence, this forward VABI provides the means for controlling the bypass operating mode and the static pressure balance at the confluence of the two bypass streams to permit the elimination of one exhaust duct and one exhaust nozzle, thereby reducing complexity and weight.

The combined bypass flow through duct 76 is further mixed with the core engine combustion gases exiting the low pressure turbine 60 in a suitable rear variable area bypass injector system 82 preferably of the type as disclosed in U.S. Pat. No. 4,072,008 issued to Milton J. Kenworthy et al. which is also assigned to the assignee of the present invention and the subject matter of which is incorporated herein by reference. A propulsive force is thus obtained by the action of the combined bypass and core engine exhaust streams being discharged from a rear thrust vectorable nozzle indicated generally at 84.

Fabrication and operation of the thrust vectorable exhaust nozzle 84 is described in greater particularity in U.S. Pat. No. 4,000,610 issued to Dudley O. Nash et al.; U.S. Pat. No. 3,979,067, issued to Dudley O. Nash; and, U.S. Pat. No. 4,000,612, issued to Thomas G. Wakeman et al., all of which are assigned to the assignee of the present invention and the subject matter of which is incorporated herein by reference. Essentially, the exhaust nozzle is provided with means for modulating the internal flow area and a rotating bonnet-type deflector 86 which diverts the exhaust stream downward during the VTOL operating modes. A variable external expansion ramp (VEER), such as a positionable control flap, downstream of the rotating bonnet provides flight maneuver vectoring as well as external expansion control. For increased thrust during VTOL operation and during forward flight operation at high Mach numbers, an afterburner shown schematically at 90 may be provided downstream of the rear VABI 82 to further energize the hot gases of combustion from the variable cycle engine.

In accordance with the present invention, the front fan section is selectively oversized to the forward cruise thrust requirements with respect to the remainder of the engine. While the amount of oversizing will be somewhat dependent upon the particular aircraft and core engine configurations, it is anticipated that a 20–30% increase in airflow would be sufficient for foreseeable aircraft installations. In the powered lift operating mode wherein the 20–30% auxiliary airflow is pressurized by the front fan section 22, a collector 92 in the form of a partial scroll around the engine casing 16 collects substantially all of the bypass flow from common bypass duct 76 and directs the flow toward the remote augmenter system 14 through a duct 94 which fluidly interconnects collector 92 with a remote burner 96. The remote burner is similar to an afterburner in which fuel is mixed with the bypass gas flow and burned to provide a high energy propulsive gas stream which is ejected through a swivelable nozzle 98 at the downstream end of duct 94. A plurality of turning vanes (not shown) may be provided to enhance turning efficiency at bends in duct 94. A valve 104 within duct 94 regulates the bypass flow rate to the remote burner 96.

Attention is now directed to FIGS. 2 and 3 wherein there is depicted schematically a representative V/STOL aircraft 106 powered by twin propulsion systems 10 of the type shown in FIG. 1. As shown, the variable cycle engines 12 are mounted within the aircraft fuselage 108 in a side-by-side arrangement with collectors 92 for extracting the bypass air from both engines. The air is then routed through a pair of ducts 94 to side-by-side remote burners 96, each provided with a swivelable nozzle 98 which is located forward of the aircraft center of gravity 110. For aircraft pitch control, the rear thrust vectorable exhaust nozzle 84 is positioned such that the rotating bonnet 86 deflects the hot exhaust gases vertically downward at a position aft of the aircraft center of gravity. Clearly, the fore and aft thrust split will be a function of the aircraft configuration and the relative distances of the remote augmenter swivelable nozzle and the thrust vectorable exhaust nozzle 84 from the aircraft's center of gravity 110. Viable propulsion system studies appear to have about one-third to one-half of the lift thrust being generated by the remote augmenter system 14 and the remainder from the rear thrust vectorable nozzle 84.

For vertical takeoff and landing operation, the variable cycle engine 12 is operated in the single bypass mode. In this mode, valve 104 is opened and the double bypass selector valve 78 is closed so that all of the air pressurized by forward fan section 22 is directed through the aft fan section 24 and routed to the common bypass duct 76 through static pressure valve 80. It is to be noted that the static pressure valve 80 discharges the highly pressurized inner bypass stream by free expansion into the common bypass duct 76 and that, in the single bypass operating mode, the outer bypass duct 70 is pressurized to a level above that in space 26, thereby requiring closure of the double bypass selector valve 78 to prevent recirculation of air and stalling of the front fan section 22. Contemporaneously, the variable area low pressure turbine nozzle 66 is closed to extract more energy from the core engine, and the variable inlet guide vanes and stator sections of the forward and aft fan sections are adjusted to maximize the airflow therethrough. In this manner, the speed of the oversized front fan section 22 is increased to drive the fan to its maximum flow and pressure ratio levels to provide a large amount of pressurized auxiliary airflow (approximately 20–30%) for use in the remote augmenter system. The majority of this air passing through common bypass duct 76 is routed through ducts 94 to the remote burner 96. It is also significant to note that lightweight material can be used for the ducting to the remote augmenters since the pressurized auxiliary air is relatively low in pressure and temperature.

A small amount of the auxiliary airflow passes collector 92 and enters a small annular passageway 112 surrounding the turbine section to provide a source of cooling air for the thrust vectorable exhaust nozzle 84. Additionally, in the powered lift VTOL operating mode, the rear variable area bypass injector 82 is closed thereby minimizing the area through which the bypass airflow could be mixed with the core exhaust stream since substantially all of the bypass airflow is being collected and routed to the remote augmenter.

In order to further enhance the lifting thrust, the energy level of the core engine exhaust stream is augmented through the use of afterburner 90 prior to exiting the thrust vectorable exhaust nozzle 84. As a result, the vectorable nozzles on both the variable cycle engine and the remote augmenter system provide a usable set of spacially separated thrust vectors for V/STOL operations, provide pitch control through differential thrust modulation and provide a potential for in-flight maneuvering through use of the variable external expansion ramp 88 and the thrust vectorable (swivelable) nozzle 98. Differential thrust modulation can be provided by variations in fuel flow to the remote burner 96 and afterburner 90.

The transition from vertical takeoff to a conventional climb-out is made with continuous operation of afterburner 90. Thereafter, transition to a forward flight speed sufficient to generate aircraft aerodynamic lift is achieved by a gradual retraction of the rotating bonnet 86 of the rear thrust vectorable exhaust nozzle 84 followed by a reduction of lift thrust from the remote augmenter 14. Reduction in remote augmenter lift thrust is accomplished, in part, by a reduction in fan speed (caused by an opening of the low pressure turbine nozzle 66) to the nominal forward flight bypass ratio condition as the air supply to the remote burner is cut off through closure of duct valve 104. Thereafter, the double bypass selector valve 78 and static pressure valve 80 are positioned to modulate the flows through outer bypass duct 70 and inner bypass duct 68 so as to optimize engine performance throughout the flight envelope.

In the double bypass operating mode typical of nonaugmented, high bypass ratio gas turbofan operation, the static pressure valve 80 is translated to the near-closed position as described in the U.S. Pat. No. 4,175,384 and functions as an ejector to pump the outer bypass duct air pressure to values lower than that in space 26 behind the front fan section 22. The transition of pressurized fan air into the outer bypass duct 70 is accomplished by translating the double bypass selector valve to the open position while simultaneously modulating the static pressure valve 80 in order to control the flow pumping of the ejector and the local static pressure balance entering common bypass duct 76. As higher speeds are attained, the double bypass selector valve may be gradually closed, thereby closing flow to the outer bypass duct and causing all of the flow from the forward fan section 22 to be further pressurized by the aft fan section 24. A portion of this flow bypasses the core engine through static pressure valve 80 and common bypass duct 76 to be thereafter mixed with the hot exhaust gases from the core engine through the rear variable area bypass injector 82 which provides a static pressure balance for efficient mixing of the two streams. Thereafter, the mixture of bypass flow and core engine hot exhaust gases is mixed with fuel and burned in afterburner 90 prior to exiting the rear thrust vectorable exhaust nozzle 84 which, in this high Mach, forward flight operating condition, is configured with the rotating bonnet 86 in the stowed position. In-flight maneuvering is enhanced by the variable external expansion ramp 88 which can cause partial deflection of the augmented exhaust stream.

The transition from horizontal flight to the vertical mode of operation is substantially the same as that required for transition from a static condition to the vertical takeoff mode wherein the remote burner 96 and afterburner 90 are activated at a relatively low level of thrust prior to deflection of the rotating bonnet 86 and development of full vertical takeoff mode thrust at the remote burner and afterburner.

Recent studies indicate that an aircraft powered by the propulsion system of the subject invention can be designed for approximately the same takeoff gross weight as a prior art lift plus lift/cruise aircraft. However, because the total installed thrust is available in the forward flight modes, it has substantially greater capabilities in the areas of excess power, acceleration time and combat ceiling.

In one study, the propulsion system of the present invention in an advanced 34,000 lb. takeoff gross weight, Mach 1.6 aircraft was compared with a similar aircraft embodying two direct lift engines with a separate inlet system used in conjunction with two vectorable cruise engines which were optimumly sized for cruise requirements (a direct lift plus lift/cruise propulsion system). Partial afterburning of the two lift/cruise engines was used for the vertical takeoff operating condition. Results indicated that an aircraft powered by the propulsion system of the present invention used about 6% less fuel in its primary mission, and by not having to develop and maintain a separate lift engine system over the life of the aircraft program, a substantial 14% lower life cycle cost was forecast. These benefits were obtained in addition to the greatly improved aircraft capability due to the variable cycle engine features.

It should become obvious to one skilled in the art that certain changes can be made to the above-described invention without departing from the broad inventive concepts thereof. For example, it may be desirable in some variable cycle engine configurations to drive both the forward and aft fan sections from the low pressure turbine, although it may require more turbine stages to satisfy the energy requirements of the combined fan. Additionally, the remote burner as described hereinabove is merely one example of a remote lifting means which could be employed with the variable cycle engine as described. For example, another remote lifting means could comprise lifting tip turbine fans driven by the auxiliary bypass flow which is routed through similar ducting 94 as described in U.S. Pat. No. 3,038,683 issued to Brian H. Rowe. Alternatively, another remote lifting means could comprise a small gas turbine engine which is substituted for the remote burner of a propulsion system of FIG. 1. This embodiment would receive the supercharged auxiliary bypass airflow from duct 94, would further energize the air and exhaust it through a forward thrust vectorable nozzle.

Additionally, it is contemplated that aircraft lateral stability could be enhanced during the powered lift mode by the addition of a second duct 114 associated with outer casing 16 (FIG. 1) which serves to route a portion of the pressurized bypass flow to the aircraft wing tips 116 (FIGS. 2 and 3) where it is ejected through downwardly exhausting nozzles, not shown. Differential lateral thrust control is provided by a valve 118 (FIG. 1) which modulates the flow rate through each duct 114. In some applications, the function of valve 118 could be provided by a variable area, thrust vectorable nozzle at the wing tip. Furthermore, instead of using bypass air, compressor interstage bleed air could be used for this purpose in which case duct 114 would communicate with the core engine compressor 46.

It will also become apparent that while the double bypass variable cycle engine adds many unique capabilities to the propulsion system of the present invention, the system is not dependent upon the engine having all of the double bypass VCE features. In fact, in some applications, a single bypass VCE that does not include the front VABI and split fan system will work quite well with the remote augmenter lift system concept to provide a vertical takeoff and landing capability.

It is intended that the apended claims cover these and all other similar variations in the present invention. Having thus described the invention, what is claimed as novel and desired to be secured by Letters Patent of the United States is:

1. A propulsion system for use in V/STOL aircraft comprising a core engine for generating high energy products of combustion, a bypass duct, having upstream and downstream ends, that bypasses the core engine, a fan upstream of said core engine for pressurizing both a bypass flow stream and a core engine flow stream, said fan being oversized in air-pumping capability with respect to the aircraft cruise requirements of the core engine, a low pressure turbine, having means to vary the area of the turbine nozzle to extract varying amounts of energy from the products of combustion from the core engine for driving the fan at varying rotational speeds and for producing bypass flow in excess of core engine requirements during lift mode operation, valve means at the upstream end of the bypass duct for modulating the relative amounts of flow in the core engine flow stream and the bypss flow stream, a remote augmenter to which the bypass stream is ducted, mixed with fuel and burned to produce thrust in the lift operating mode, a nozzle with means for selectively vectoring thrust and for exhausting the core engine high energy products of combustion, and a continuation of the bypass duct for routing the bypass stream to the thrust vectorable nozzle when operating in other than the lift mode.

2. The propulsion system as recited in claim 1 wherein said fan includes an oversized front fan section driven by said low pressure turbine, an aft fan section, and further comprising generally coannular outer and inner bypass ducts for receiving pressurized bypass streams from the front and aft sections, respectively, means for modulating the relative flow rates through said outer and inner bypass ducts, a common bypass duct for receiving the pressurized streams from the outer and inner bypass ducts and routing them as a common bypass stream to the thrust vectorable nozzle when operating in other than the lift mode, a collector for extracting a portion of air from the common bypass stream in the lift mode and a duct for transferring the collected portion of air to the remote augmenter.

3. The propulsion system as recited in claim 1 further comprising another vectorable nozzle through which the remote augmenter gas stream is exhausted.

4. The propulsion system as recited in claim 1 further comprising a variable area bypass injector for mixing the core engine products of combustion with the bypass flow stream.

5. The propulsion system as recited in claim 1 further comprising a duct for routing the bypass stream to the remote augmenter and a flow control valve within said duct.

6. The propulsion system as recited in claim 2 wherein said aft fan section is rotationally driven by the core engine.

7. A propulsion system for use in V/STOL aircraft comprising a core engine having a compressor, a combustor in which compressed air is mixed with fuel and burned to produce high energy products of combustion, a high pressure turbine for supplying rotational energy to the compressor in serial flow relation, a split fan with a front fan section oversized in air pumping capability with respect to the aircraft cruise requirements of the downstream core engine, a low pressure turbine, driven by the products of combustion, having a turbine nozzle for supplying rotational energy to the front fan section said nozzle having means for varying the area of the turbine nozzle and for modulating the energy so supplied so as to drive the front fan section at a rotational speed sufficient to pump a quantity of air in excess of core engine requirements, a common bypass duct for receiving the air from the oversized front fan section as a bypass stream and routing at least a portion of the bypass stream to join the products of combustion downstream of the low pressure turbine, means for modulating the bypass flow stream into the common bypass duct, remote lifting means to which a portion of the bypass flow is ducted for producing a first quantity of thrust, an afterburner downstream of the low pressure turbine for further energizing the products of combustion and a nozzle with means for selectively vectoring thrust and for exhausting the further energized products of combustion to produce a second quantity of thrust.

8. The propulsion system as recited in claim 7 further comprising an aft fan section disposed in serial flow relation between the front fan section and the core engine, and generally coannular outer and inner bypass ducts for receiving pressurized air from the front and aft fan sections, respectively, wherein the flow rates passing through said outer and inner bypass ducts and entering said common bypass duct are controlled by said modulating means.

9. The propulsion system as recited in claim 8 further comprising a collector for extracting the bypass flow from the common bypass duct prior to ducting it to the remote lifting means.

10. The propulsion system as recited in claim 8 wherein said remote lifting means comprises a remote augmenter to which the bypass flow is ducted, mixed with fuel and combusted to produce a remote, energized gas stream, and a vectorable nozzle through which said remote gas stream is exhausted.

11. The propulsion system as recited in claim 10 further comprising a duct for routing the bypass flow to the remote augmenter and a flow control valve within said duct.

12. The propulsion system as recited in claim 8 further comprising a variable area bypass injector for mixing the core engine products of combustion with pressurized airflow from the common bypass duct.

13. The propulsion system as recited in claim 8 wherein said aft fan section is rotationally driven by the high pressure turbine.

14. A propulsion system for use in V/STOL aircraft comprising:
   a front fan section for pressurizing a flow of air;
   an aft fan section for thereafter selectively pressurizing at least a portion of the airflow from the front fan section;
   a core engine downstream of the aft fan section having a compressor, a combustor for producing high energy products of combustion, and a high pressure turbine supplying rotational energy to the compressor;
   a low pressure turbine having a turbine nozzle and means for varying the area of the turbine nozzle for modulating the rotational energy supplied to the front fan section;
   generally coannular outer and inner bypass ducts for receiving pressurized air from the front and aft fan sections, respectively;
   means for modulating the flow rates through said outer and inner bypass ducts;
   a common bypass duct for receiving pressurized air from said outer and inner bypass ducts and routing at least a portion of the air to join the products of combustion downstream of the low pressure turbine;

remote lifting means to which a portion of the pressurized air from the common bypass duct is ducted for producing lifting thrust;

an afterburner for further energizing the products of combustion; and a nozzle with means for selectively vectoring thrust and for exhausting the further energized products of combustion; and wherein the front fan section is oversized in air pumping capability with respect to the core engine cruise operating requirements.

* * * * *